Jan. 2, 1951
N. S. FOCHT
2,536,543
ENDLESS TRACK RUNNING GEAR FOR
LOW SUSPENDED VEHICLES
Filed Oct. 6, 1947
2 Sheets-Sheet 1
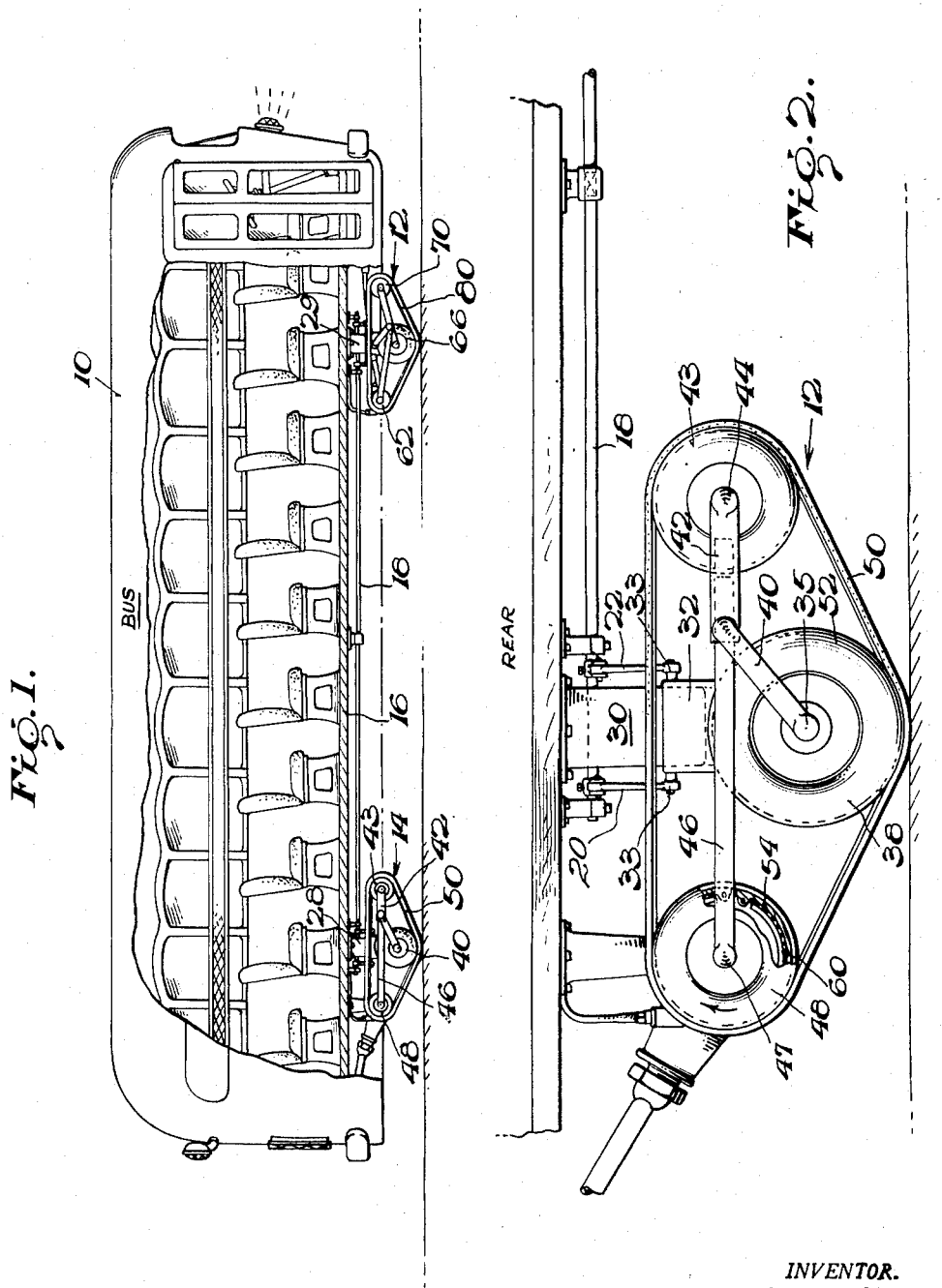
INVENTOR.
Nevin S. Focht.
BY
Attorney Jan. 2, 1951
N. S. FOCHT
2,536,543
ENDLESS TRACK RUNNING GEAR FOR
LOW SUSPENDED VEHICLES
Filed Oct. 6, 1947
2 Sheets-Sheet 2
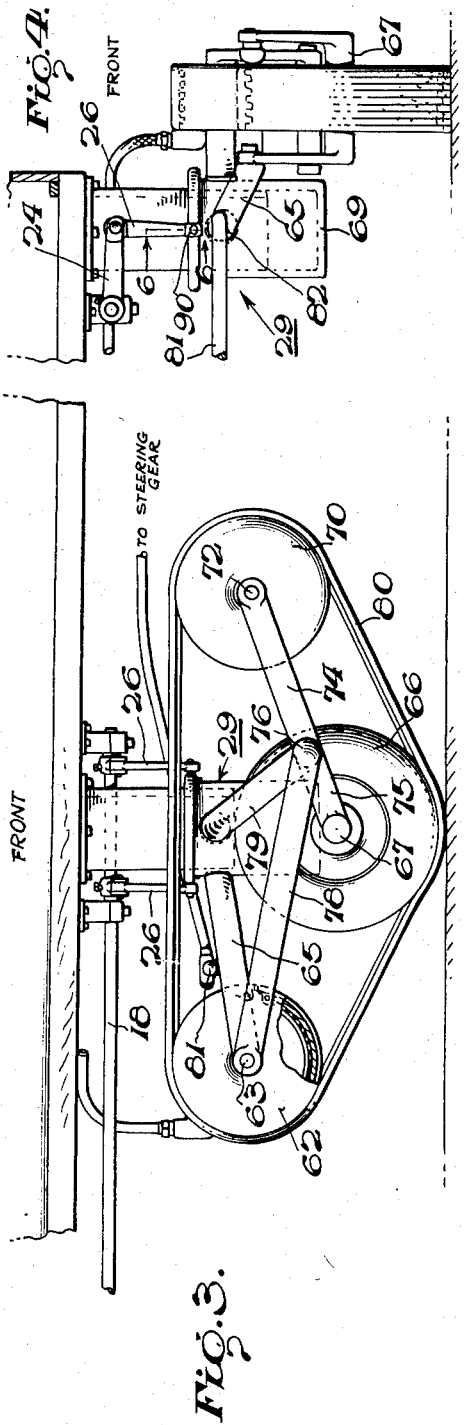
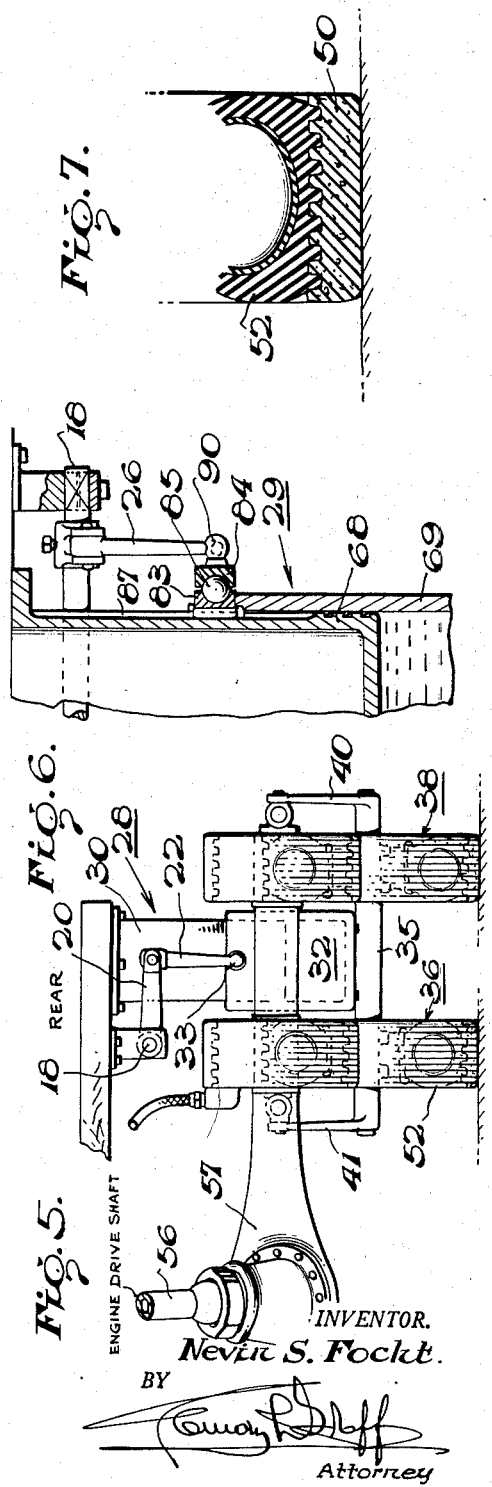
INVENTOR.
Nevin S. Focht.
BY
Attorney Patented Jan. 2, 1951

2,536,543

UNITED STATES PATENT OFFICE 2,536,543

ENDLESS TRACK RUNNING GEAR FOR LOW SUSPENDED VEHICLES

Nevin S. Focht, Syracuse, N. Y.

Application October 6, 1947, Serial No. 778,123

10 Claims. (Cl. 180—9.1)

The present invention relates to wheel substitutes for low suspended vehicles, such as buses, trucks, trailers and the like.

Usually, for example large passenger buses, which are taking place of the electric street car, must for convenience of the passengers and to provide for proper balance and riding comfort be mounted at a predetermined level to the street. In so mounting the bus body it is necessary to provide wells or housings on each side of the body for the wheels of the vehicle, as the upper peripheries of the wheels come above the floor level of the bus. These wheel wells or housings prevent full width seating the full length of the bus and it has long been the desire of automotive engineers to find some way of eliminating the conventional wheel, with its attendant wheelhousing.

Accordingly, an object of this invention is to provide a novel substitute for the conventional vehicle wheel, whereby greater seating capacity in a standard length bus is possible.

Another object is to provide a traction device of low rolling-radius suspension adapted to allow for a lower loading floor height.

A further object is to provide a traction running gear, wherein the road contact area is precisely the same as that of a conventional tire.

A still further object is to develop a traction unit having more efficient action and greater economy in use than the usual known conventional tired wheel, wherein, for example, greater dampening and less unsprung weight is provided, to thereby give longer life not only to the running gear per se, but to the vehicle with a resulting less maintenance cost.

Yet another object is to provide in a traction unit for vehicles having a low rolling-radius, an endless belt traction drive and special tensioning means for the endless belt adapted to be controlled by the load on the traction unit.

With these and other objects in view, the invention consists in the construction, arrangement and combination of parts hereinafter described and particularly pointed out in the claims. It is to be understood that I do not intend to limit myself to the details of construction except as defined by the appended claims.

In the drawings wherein like reference characters refer to like parts throughout the several views, Figure 1 is a side view of a passenger bus partly in cross section illustrating the greater width seating capacity thereof over a conventional wheel type bus.

Figure 2 is a detailed side view of one of the rear traction members constructed according to the present invention.

Figure 3 is a detailed side view of one of the front traction members.

Figure 4 is an end view of the front traction member of Figure 3.

Figure 5 is an end view of the rear traction member of Figure 2.

Figure 6 is a partial cross section view of the steering connection to the front traction members.

Figure 7 is a fragmentary cross section of the ground-engaging part of the traction members.

Referring to the drawings in detail and first with reference to Figure 1, there is illustrated, for example, a bus 10, which is mounted on the novel front and rear traction members or bogies 12 and 14 of the present invention. The front and rear traction members 12 and 14, respectively, are mounted from the underside of the vehicle floor 16 and are connected together indirectly by a suspension equalizing torsion bar 18 and rear connecting links 20 and 22, and front links 24 and 26 on each side of each front and rear pneumatic suspension unit.

The rear pneumatic suspension units are numbered 28 and the front units 29. Each of the rear units 28 are in the form of a pair of upper and lower tubular telescopically mounted members 30 and 32 which function like a piston and cylinder or a pneumatic dash-pot upon relative movement. For example, air or fluid is trapped in the lower portions of the suspension units to serve as shock absorbers. The lower of these members 32 is connected by a ball joint 33 to the lower connecting link 22 of the torsion rod linkage, and the bottom portion of the member 32 is secured to an axle 35 between each pair of the dual rear suspension bogie wheels 36 and 38 of the rear traction units, see Figure 5.

These rear units are of the dual type to take care of heavier loads at the rear of the bus. For example, as shown in Figure 5, the suspension bogie wheels 36 and 38 are spaced apart on the axle 35 and from the outer ends of this axle extend links 40 and 41. These links each pivotally connect with the end of a hollow arm 42, connected to the axle 44 of a grooved idler bogie wheel 43. Telescopically mounted in the hollow arm 42 is the free end of an arm 46 connected to the axle 47 of a grooved braking bogie wheel 48, as shown in Figure 2. These arms, and their axle connections, serve as a tensioning arrangement for a traction belt 50.

The belt 50 is stretched around the spaced dual bogie wheels. The interior of the belt 50 is longitudinally formed with V-shaped grooves for cooperative interengagement with corresponding mating grooves on the bogie wheels.

The main or suspension rear dual bogie wheels 36 and 38 are formed to receive grooved pneumatic tires 52, while the other relatively smaller rear dual bogie wheels are preferably covered with solid grooved rubber treads 54. The rear dual braking bogie wheels 48 are driven from an engine drive shaft 56 and differential gearing, not shown, in the housing 57 in the usual well-known manner for all automotive vehicles. Thus power is imparted from the rear dual bogie wheels 48 to the endless ground engaging traction belt 50, which as it turns also revolves the idler bogie wheels 43 and the suspension bogie wheels 36 and 38. When an obstruction is rolled over, the suspension bogie wheels will elevate and impart vertical motion through axle 35 to the lower cup-like member 32 of the tubular suspension members 28, whereupon the connecting links 20—22 and the torsion bars 18 serve to transmit an equalizing action to the front suspension and steering units to be hereinafter described.

The dual braking bogie wheels 48 may have either mechanically or fluid operated brake shoes, which shoes 60 are shown in Figure 2 and may be of any desired type.

The front suspension units 29 on each side of the vehicle include similar bogie wheels. However, these bogies are mounted for steering and the tensioning arrangement for the traction belt is different in structure, but generally the same in principle of operation. For example, the front units are single and not of the dual type. The braking bogie wheel 62 of the front units is mounted on an axle 63, suspended from a bracket 65; the single front suspension bogie wheel 66 is mounted on an axle 67 and is connected to the lower cupped portion 69 in which telescopes the fixed upper portion 68 of the tubular member 29, and the idler bogie wheel 70 is mounted on a floating axle 72 connected to a pair of side levers 74, which also connect to a link 75 on the axle 67 of the suspension bogie wheel. The levers 74 pivot on the fulcrum point 76 of the pairs of positioning levers 78 and 79. Thus a vertical movement of the suspension bogie wheels causes the leverage system above described to tension the endless drive or traction belt 80, as the levers pivot up or down on the fulcrum point 76.

The bracket 65 is secured to the lower part of the tubular pneumatic suspension member 23, as shown in Figure 4. This bracket has secured to it a radius rod 81 by means of a ball and socket connection 82. The front pneumatic suspension members 29 are each used as a king pin for steering the front units or bogies. To allow for the turning of the lower part 69 of the tubular member 29 without interfering with the connecting links 26 of the torsion rod 18 there is provided a bearing arrangement comprised of inner and outer race sections 83 and 84, see Figure 6. These sections are held together by ball bearings 85. The inner race 83 abuts and rests on the rim of lower portion 69 and is grooved to permit sliding movement with respect to an elongated key or rib 87 formed longitudinally along a side of the upper fixed portion 68. Thus when portion 69 moves vertically it permits the bearing to move up and down with it along the key 87. The torsion rod connecting links 26 are joined to the outer race ring 84 by a ball and socket connection 90 and the rear and front members 28 and 29 are thus connected for equalized suspension without interference to front unit steering.

Thus from the above described structure it is apparent when movement is imparted to the radius rod 81 by the steering gear, not shown, there is a pull on the brackets 65 in one direction or the other and the suspension bogies are turned with the lower portion 69, which swivels around the fixed upper tubular portion 68.

From the foregoing the operation of the traction units or bogies should be apparent without further description. For example, other than to generally sum up the advantages of the invention, there is thus provided a new, useful, economical, durable and highly efficient traction unit or bogie of low rolling radius for low suspended vehicles, with novel tension maintaining means responsive to load and vertical movements of pneumatic suspension units. Also, the bogie wheels of these units are so arranged and proportioned with respect to each other as to provide a ground engagement precisely the same as made by a conventional tired vehicle wheel, thereby making free rolling travel over the city streets much the same as with a conventional wheel, and allowing for the elimination of space consuming wheel housings; and also providing an unsprung mass which dampens the rebound of the pneumatic tire 52 on the suspension bogie wheels.

Although only one actual embodiment of the invention has been illustrated and described in detail, it is to be expressly understood that the invention is not limited thereto and various changes may be made in the design, arrangement and combination of parts without departing from the spirit and scope of the invention, as will now likely occur to others skilled in the art. For a definition of the limits of the invention, reference should be had to the appended claims.

What is claimed is:

1. A traction bogie unit for land vehicles having a low floor level comprising a plurality of rotatable members, an endless ground engaging means around said members, one of said members constituting a vertically independently movable suspension member with respect to the other of said rotatable members for holding a portion only of said ground engaging means in contact with the ground, and said remaining members serving to stretch said means and hold the same elevated between the vehicle floor and the ground.

2. A traction bogie unit for land vehicles having a low floor level comprising a plurality of rotatable members, an endless ground engaging means around said members, one of said members constituting a vertically movable suspension member for holding a portion only of said ground engaging means in contact with the ground, said remaining members serving to stretch said means and hold the same elevated between the vehicle floor and the ground, and tensioning means for said ground engaging means responsive to the vertical movements of said suspension member.

3. A bogie unit of low rolling radius for vehicles comprising a fluid suspension unit having upper and lower reciprocable telescoping members, said upper member being fixed to the floor of the vehicle and the lower member being movable, suspension equalizing means interconnecting the front and rear lower members of the telescoping members on each side of the vehicle, a bogie suspension wheel for each bogie unit carried by the said lower members, a pair of elevated bogie wheels positioned fore and aft of said suspension wheel, a traction belt looped around said bogie suspension wheel and said pair of elevated bogie wheels, each of said bogie wheels being rotatably mounted on axles, and belt tensioning linkage connected between each of said axles.

4. A bogie unit of low rolling radius for vehicles comprising a fluid suspension unit having upper and lower reciprocable telescoping members, said upper member being fixed to the floor of the vehicle and the lower member being movable, suspension equalizing means interconnecting the front and rear lower members of the telescoping members on each side of the vehicle, a bogie suspension wheel for each bogie unit carried by the lower members, a pair of elevated bogie wheels positioned fore and aft of said suspension wheel, a traction belt looped around said bogie suspension wheel and said pair of elevated bogie wheels, each of said bogie wheels being rotatably mounted on axles, links extending from the axle of the suspension bogie wheel, and a pair of telescoping links, one of each of said latter links being connected to the axles of said elevated fore and aft bogie wheels, said first-mentioned links of the suspension bogie wheel being connected to one of said telescoping links, whereby vertical movement of said suspension bogie wheel imparts movement through said linkage to said elevated bogie wheels to tension said belt.

5. A wheel substitute for vehicles comprising an endless traction belt formed with an exterior surface tread for ground contact and with a plurality of longitudinal grooves around its interior surface, a group of rubber covered wheels mounted within the loop of the belt having projections interengaging with said grooves, one of said wheels being supported by a suspension member secured to the floor of a vehicle, said other wheels being relatively smaller than said suspension member wheel to thereby curve said belt sharply upwardly from the ground adjacent the periphery of said suspension member wheel, an axle for rotatably mounting each wheel, and linkage means interconnecting the axles of the group of wheels, whereby vertical movement of the said suspension member wheel under load automatically adjusts the other wheels of the group to maintain the said belt taut.

6. A wheel substitute for vehicles comprising an endless traction belt formed with an exterior surface tread for ground contact and with a plurality of longitudinal grooves around its interior surface, a group of rubber covered wheels mounted within the loop of the belt having projections interengaging with said grooves, one of said wheels being supported by a suspension member secured to the floor of a vehicle, said other wheels being relatively smaller than said suspension member wheel to thereby curve said belt sharply upward from the ground adjacent the periphery of said suspension member wheel, an axle for rotatably mounting each wheel, a pair of side levers carried by the axle of said suspension member wheel and connected to the axle of one of the said smaller wheels, a second pair of side levers carried by the axle of the remaining small wheel, one of each of the second levers being pivoted to an intermediate fulcrum point on one of said first pair of side levers, and a third pair of levers one of each being pivoted at an end to said intermediate fulcrum point and the other end to the lower part of said suspension member.

7. A vehicle having traction bogies of the endless belt type comprising a suspension bogie wheel, a braking bogie wheel and an idler bogie wheel encircled by an endless belt adapted to be curved into contact with the ground by said suspension bogie wheel, and a tubular telescopic suspension means having upper and lower relatively movable parts for each of said traction bogies.

8. A vehicle having traction bodies of the endless belt type comprising a suspension bogie wheel, a braking bogie wheel and an idler bogie wheel encircled by an endless belt adapted to be curved into contact with the ground by said suspension bogie wheel, a tubular telescopic suspension means having upper and lower relatively movable parts for each of said traction bogies, and suspension equalizing means comprising torsion bars and levers connecting the same with each of said suspension means.

9. A vehicle having traction bogies of the endless belt type comprising a suspension bogie wheel, a braking bogie wheel and an idler bogie wheel encircled by an endless belt adapted to be curved into contact with the ground by said suspension bogie wheel, a tubular telescopic suspension means having upper and lower relatively movable parts for each of said traction bogies, steering mechanism connected to the lower part of said telescopic suspension means adapted to rotate the said lower part on the said upper part to thereby effect a steering of the vehicle.

10. In a vehicle having front and rear vehicle traction bogies of the endless tread type, fluid shock absorbing suspension members, suspension equalizing means connected to said suspension members, said rear bogies being of dual tread construction, said front bogies being of single tread construction, steering means for turning said front bogies on said suspension members, and bearings connected between said front bogies and said suspension equalizing means to permit turning of said front bogies for steering independently of said suspension equalizing means.

NEVIN S. FOCHT.

REFERENCES CITED

The following references are of record in the file of this patent:

UNITED STATES PATENTS

| Number | Name | Date |
| --- | --- | --- |
| 484,828 | Stewart | Oct. 25, 1892 |
| 1,062,318 | Berlin | May 20, 1913 |
| 1,329,307 | Norelius | Jan. 27, 1920 |
| 1,348,558 | Garner et al. | Aug. 3, 1920 |